United States Patent
Shila et al.

(10) Patent No.: US 11,418,517 B2
(45) Date of Patent: Aug. 16, 2022

(54) CREATION OF A BLOCKCHAIN FOR MAINTENANCE RECORDS

(71) Applicant: OTIS ELEVATOR COMPANY, Farmington, CT (US)

(72) Inventors: Devu Manikantan Shila, West Hartford, CT (US); Adriaan Larmuseau, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 448 days.

(21) Appl. No.: 16/536,501

(22) Filed: Aug. 9, 2019

(65) Prior Publication Data

US 2020/0053102 A1    Feb. 13, 2020

(30) Foreign Application Priority Data

Aug. 10, 2018 (CN) .......................... 201810913177.9

(51) Int. Cl.
| | |
|---|---|
| *H04L 29/06* | (2006.01) |
| *H04L 9/40* | (2022.01) |
| *G06K 7/14* | (2006.01) |
| *G06F 16/23* | (2019.01) |

(52) U.S. Cl.
CPC ........ *H04L 63/126* (2013.01); *G06F 16/2379* (2019.01); *G06K 7/1417* (2013.01)

(58) Field of Classification Search
CPC ... H04L 63/126; G06F 16/2379; G06F 21/60; G06F 21/62; G06K 7/1417
See application file for complete search history.

(56) References Cited

U.S. PATENT DOCUMENTS

| | | | |
|---|---|---|---|
| 7,003,434 B2 | 2/2006 | Azpitarte | |
| 8,198,986 B2 | 6/2012 | Craik | |
| 2015/0112704 A1* | 4/2015 | Braun | G16H 40/20 |
| | | | 705/2 |
| 2017/0372600 A1 | 12/2017 | Palin et al. | |
| 2018/0103042 A1* | 4/2018 | Castagna | H04L 63/0428 |

FOREIGN PATENT DOCUMENTS

| | | |
|---|---|---|
| CN | 102761569 | 10/2012 |
| CN | 203529637 U | 4/2014 |
| CN | 104463415 | 3/2015 |
| CN | 104495545 | 4/2015 |
| CN | 105293236 | 2/2016 |
| CN | 205151423 U | 4/2016 |
| CN | 106355126 | 1/2017 |

(Continued)

OTHER PUBLICATIONS

Sharjeel Ahmed et al.; "A System and Method for Monitoring and Managing the Maintenance Activities of an Asset or Assets" Oct. 6, 2016; 28 pages.

*Primary Examiner* — Malcolm Cribbs
(74) *Attorney, Agent, or Firm* — Cantor Colburn LLP

(57) ABSTRACT

A method of utilizing blockchain to verify maintenance data of a system including: determining a part identity of a part of a system; detecting a location of the system; detecting a time stamp depicting when maintenance was performed on the part of the system; organizing the part identity of the part, the location of the part, and the time stamp into a maintenance data package receipt; and uploading the maintenance data package receipt into a blockchain network.

15 Claims, 3 Drawing Sheets

(56) References Cited

FOREIGN PATENT DOCUMENTS

| | | |
|---|---|---|
| CN | 106779100 | 5/2017 |
| CN | 107085746 | 8/2017 |
| CN | 107187985 | 9/2017 |
| CN | 107239834 | 10/2017 |
| WO | 9608437 | 3/1996 |
| WO | WO-2015100278 A1 * | 7/2015 ............. G07C 5/008 |

* cited by examiner

CREATION OF A BLOCKCHAIN FOR MAINTENANCE RECORDS

CROSS-REFERENCE TO RELATED APPLICATIONS

This application claims the benefit of Non Provisional Chinese Application No. 201810913177.9 filed Aug. 10, 2018, which is incorporated herein by reference in its entirety.

BACKGROUND

The subject matter disclosed herein relates generally to the field of maintenance record systems, and specifically to a method and apparatus for managing maintenance record systems.

Field mechanics are increasingly trying to complete maintenance and repair tasks more efficiently and safely. Maintenance records are largely paper based and may be kept onboard or proximate the system being maintained to ensure that different field mechanics may have access to the maintenance records.

BRIEF SUMMARY

According to an embodiment, a method of utilizing blockchain to verify maintenance data of a system is provided. The method including: determining a part identity of a part of a system; detecting a location of the system; detecting a time stamp depicting when maintenance was performed on the part of the system; organizing the part identity of the part, the location of the part, and the time stamp into a maintenance data package receipt; and uploading the maintenance data package receipt into a blockchain network.

In addition to one or more of the features described herein, or as an alternative, further embodiments may include: authenticating the maintenance data package receipt in the blockchain network.

In addition to one or more of the features described herein, or as an alternative, further embodiments may include: verifying the maintenance data package receipt in the blockchain network.

In addition to one or more of the features described herein, or as an alternative, further embodiments may include: storing the maintenance data package receipt into a blockchain network.

In addition to one or more of the features described herein, or as an alternative, further embodiments may include retrieving the maintenance data package receipt from the blockchain network.

In addition to one or more of the features described herein, or as an alternative, further embodiments may include that retrieving the maintenance data package receipt from the blockchain network further includes: scanning a QR code identifying the system; and retrieving the maintenance data package of the system from the blockchain network.

In addition to one or more of the features described herein, or as an alternative, further embodiments may include that the maintenance data package receipt further comprises an image of the part.

In addition to one or more of the features described herein, or as an alternative, further embodiments may include: capturing an image of at least one of the system and the part; and organizing the image into the maintenance data package receipt.

In addition to one or more of the features described herein, or as an alternative, further embodiments may include that the maintenance data package receipt further comprises maintenance notes for the part.

In addition to one or more of the features described herein, or as an alternative, further embodiments may include: receiving maintenance notes from an individual that performed maintenance on the part of the system; and organizing the maintenance into the maintenance data package receipt.

In addition to one or more of the features described herein, or as an alternative, further embodiments may include that the signature of an individual is a public identification key of a mobile computing device belonging to the individual.

In addition to one or more of the features described herein, or as an alternative, further embodiments may include that the system is conveyance system.

In addition to one or more of the features described herein, or as an alternative, further embodiments may include: obtaining a signature of an individual that performed maintenance on the part of the system; and organizing the signature into the maintenance data package receipt.

According to another embodiment, a computer program product tangibly embodied on a computer readable medium is provided. The computer program product including instructions that, when executed by a processor, cause the processor to perform operations including: determining a part identity of a part of a system; detecting a location of the system; detecting a time stamp depicting when maintenance was performed on the part of the system; organizing the part identity of the part, the location of the part, and the time stamp into a maintenance data package receipt; and uploading the maintenance data package receipt into a blockchain network.

In addition to one or more of the features described herein, or as an alternative, further embodiments may include that the operations further include: authenticating the maintenance data package receipt in the blockchain network.

In addition to one or more of the features described herein, or as an alternative, further embodiments may include that the operations further include: verifying the maintenance data package receipt in the blockchain network.

In addition to one or more of the features described herein, or as an alternative, further embodiments may include that the operations further include: storing the maintenance data package receipt into a blockchain network.

In addition to one or more of the features described herein, or as an alternative, further embodiments may include: retrieving the maintenance data package receipt from the blockchain network.

In addition to one or more of the features described herein, or as an alternative, further embodiments may include retrieving the maintenance data package receipt from the blockchain network further includes: scanning a QR code identifying the system; and retrieving the maintenance data package of the system from the blockchain network.

According to another embodiment, a method of utilizing blockchain to verify maintenance data of a system is provided. The method including: creating a maintenance data package receipt, and uploading the maintenance data package receipt into a blockchain network.

Technical effects of embodiments of the present disclosure include uploading maintenance records of a conveyance system into a blockchain network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
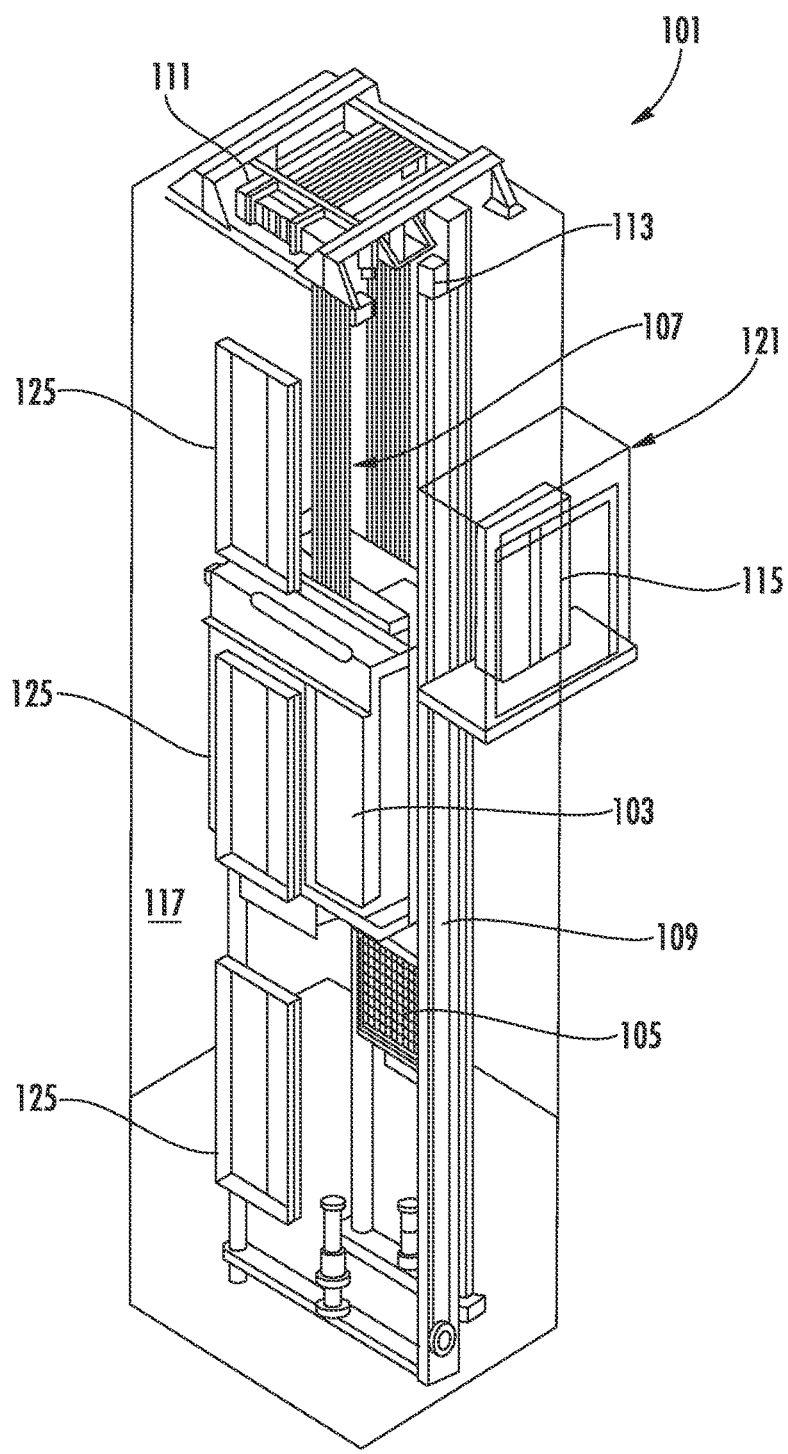
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. In other embodiments, the system comprises any apparatus requiring maintenance and maintenance records. Accordingly, embodiments described herein are not limited to elevator systems or conveyance system, such as that shown in FIG. 1.

Figure 2:
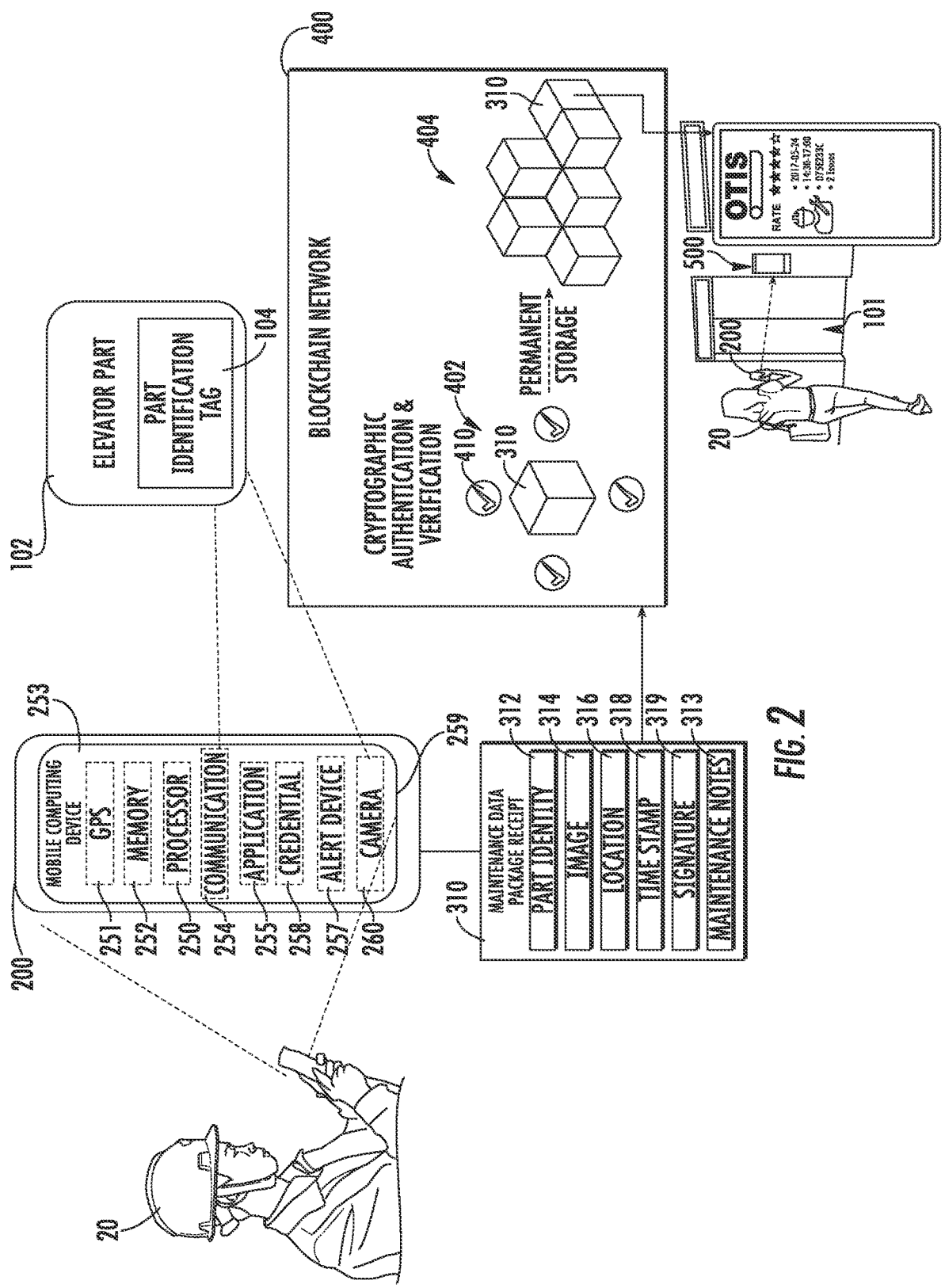
FIG. 2 illustrates a schematic view of a blockchain maintenance record system, in accordance with an embodiment of the disclosure.

Referring now to FIG. 2 with continued reference to FIG. 1. FIG. 2 shows a blockchain maintenance record system 10 for the elevator system 101 of FIG. 1, in accordance with an embodiment of the present disclosure. The blockchain maintenance record system 10 includes a mobile computing device 200 capable of being carried by an individual 20 (e.g., elevator technician) on-site to an elevator system 101. The mobile computing device 200 may be a device that is typically carried by a person, such as, for example a phone, PDA, smart watch, tablet, laptop, etc. The mobile computing device 200 includes a display screen 253 configured to display information and data to the individual 20 using the mobile computing device 200. The mobile computing device 200 may also include a data input mechanism 259 configured to allow the individual to enter data into the mobile computing device 200. The data input mechanism 259 may be a touchscreen, keyboard, mouse, trackpad, trackball, microphone, or any other similar data input mechanism 259 known to one of skill in the art.

The mobile computing device 200 may include a processor 250, memory 252, communication module 254, and a global positioning system (GPS) device 251, as shown in FIG. 2. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile computing device 200 including executable instructions stored therein, for instance, as firmware. The communication module 254 may implement one or more communication protocols as described such as for example short-range communication and/or long-range communication. Short-range communication may include but is not limited to radio signal, radio-frequency identification (RFID), Bluetooth, Wi-Fi, HaLow (801.11ah), zWave, Zigbee, or Wireless M-Bus. Long-range communication may include but is not limited to cellular, satellite, LTE (NB-IoT, CAT M1), LoRa, Satellite, Ingenu, or SigFox. The mobile computing device 200 may include a credential 258 indicating what individual 20 the mobile computing device 200 belongs to. The mobile computing device 200 may include an alert device 257 configured to activate an alarm. In three non-limiting examples, the alert device 257 may be a vibration motor, audio speaker, and/or display screen. The alarm may be audible, visual, haptic, and/or vibratory.

The mobile computing device 200 may be capable of capturing images of elevator parts 102 of the elevator system 101 via a camera 260 that is included within the mobile computing device 200 and/or operably attached to the mobile computing device 200. In one example, the camera 260 may be a smartphone camera included in the smartphone (i.e., the mobile computing device). In another example, the camera 260 may be a separate camera that is operably attached to the mobile computing device 200 via a wired and/or wireless attachment mechanism.

The mobile computing device 200 may also include an application 255. Embodiments disclosed herein, may operate through the application 255 installed on the mobile computing device 200. The application 255 may be installed directly on the mobile computing device 200 and/or the application 255 may a software as a service (SaaS) located on a remote hard drive and access via an internet connection by the mobile computing device 200. Using the application 255, the individual 20 may identify each elevator part 102 to determine a part identity 312. The application 255 may be configured to determine a part identity 312 from a part identification tag 104 located on the part 102. The mobile computing device is configured to read the part identification tag 104 through the application 255. In an embodiment, the part identification tag 104 may be a near field communication (NFC) device that utilizes near field communication (i.e., short-range communication) to communicate with the application 255 through the communication module 254 of the mobile computing device 200. In another embodiment, the part identification tag 104 may be an RFID transponder that communicates with the application 255 through the communication module 254 of the mobile computing device 200, utilizing radio signals. In another embodiment, the part identification tag 104 may be a bar code and/or a QR (Quick Response) code that may be read by the camera 260 of the mobile computing device 200. The part identification tag 104 may be encoded with a unique identifier to be recorded on the blockchain.

The individual 20 performing the maintenance on the part 102 may enter in maintenance notes 313 into the application 255 via the data input mechanism 259. The maintenance notes 313 may depict the maintenance that was performed, the condition of the part 102, etc. The maintenance data notes 313 and the part identity 312 may be organized into a maintenance data package receipt 310 by the application 255. The maintenance data package receipt 310 may include the part identity 312, maintenance notes 313, images 314 of the part 102, a location 316 of the part 102, a time stamp 318 of when the maintenance was performed on the part 102, and a signature 319 of the individual 20 who performed the maintenance. The maintenance data package receipt 310 may also include additional data not described herein.

The part identity 312 may include a serial number of the part 102, a part number of the part 102, a manufacturer of the part 102, an origin of manufacture of the part 102, and/or a batch number of the part 102. The image 314 may be a still and/or video image depicting the part 102, the elevator system 101, or the maintenance performed on the part 102 and/or the elevator system 101. The location 316 may be a geographical location of the part 102 and the elevator system 101. The location 316 may also be a specific building (e.g., empire state building, customer, serial number of the elevator, etc.). The location 316 may be determined utilizing the GPS device 251 of the mobile computing device 200. The location 316 may also be determined utilizing triangulation of wireless signals within a building, such as, for example, Wi-Fi triangulation or Bluetooth triangulation. The location 316 will provide verifiable proof that the individual 20 carrying the mobile computing device 200 was at the location of the elevator system 101 at the time of the maintenance. The time stamp 318 may depict the time and date that the maintenance was performed on the part 102 and/or the elevator system 101. The signature 319 may be an automatic electronic signature that identifies owner of the mobile computing device 200 through the credential 258 of the mobile computing device 200. The credential 258 may be a public identification key of the individual 20.

The application 255 is configured to upload the maintenance data package receipt 310 to a blockchain network 400 using the communication module 254. At 402, once uploaded to the blockchain network 400, the maintenance data package receipt 310 may be verified by a global network of peers 410 in such a way that the maintenance data package receipt 310 cannot be altered retroactively or forged. Similar to other blockchain networks the blockchain network 400 stores the maintenance data package receipt 310 in such a way that the maintenance data package receipt 310 being stored on the blockchain network 400 cannot be forged or altered retroactively. The blockchain network 400 may include additional data validation rules through a smart contract to determine which the maintenance data package receipt 310 is valid/invalid. In an embodiment, the blockchain network 400 may only establish that a maintenance job was executed by this specific individual 20 (e.g., maintenance person) at a specific point in time. Further, in an embodiment, verification of the exact maintenance actions taken by the individual 20 as described in the maintenance data package receipt 310 may be done by an originator of the part identification tags, which may be the manufacture of the elevator system 101 and/or an operator/owner of the elevator system 101. Once authenticated and verified at 402, the maintenance data package receipt 310 may be permanently stored on the blockchain network at 404. As mentioned above, the blockchain network 400 stores the maintenance data package receipt 310 in such a way that the maintenance data package receipt 310 is unforgeable and unalterably by utilizing various blockchain technique including but not limited to creating multiple copies of the data maintenance data package receipt 310 and using a data consistency checking technique called hashing.

Advantageously, by storing the maintenance data package receipt 310 in the blockchain network the maintenance data package receipt 310 may be accessible to any individual 20 utilizing a computing device (e.g., the mobile computing device 200). In the example shown in FIG. 2, an individual (e.g., a customer or elevator technician) may view the maintenance data package receipt 310 via a mobile computing device 200 by scanning a QR code 500 using a camera 260 on the mobile computing device 200. The QR code 500 may be located proximate the elevator system 101. The QR code 500 may identify the elevator system 101 and pull all or the latest maintenance data package receipts 310 for viewing on the mobile computing device 200.

Figure 3:
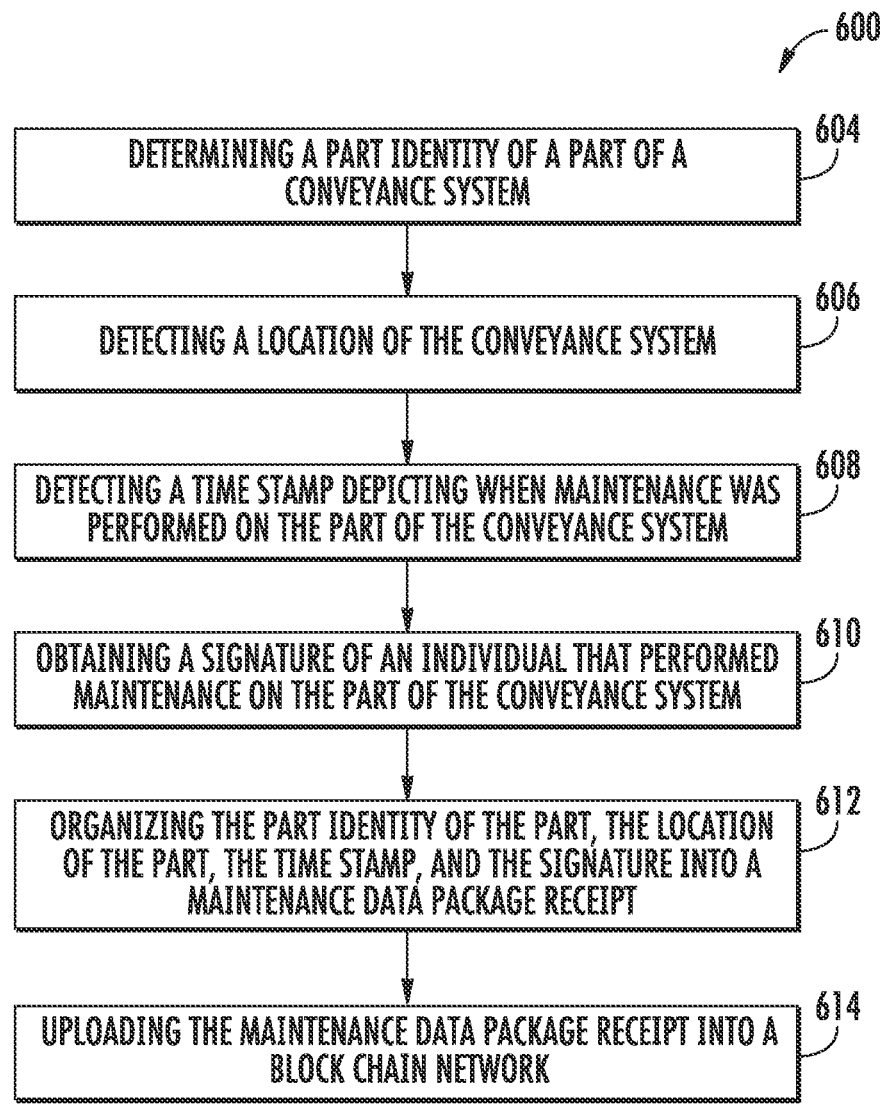
FIG. 3 is a flow chart of method of monitoring maintenance performed on a conveyance system, in accordance with an embodiment of the disclosure.

Referring now to FIG. 3, while referencing components of FIGS. 1 and 2. FIG. 3 shows a flow chart of method 600 of monitoring maintenance performed on a conveyance system in accordance with an embodiment of the disclosure. The method 600 may comprise creating a maintenance data package receipt 310 and uploading the maintenance data package receipt 310 into a blockchain network 400. In an embodiment, blocks 604-614 of the method 400 may be performed by the application 255 of the mobile computing device 200.

At block 604, a part identity 312 of a part 102 of a conveyance system (e.g., elevator system 101) is determined. In an embodiment, the conveyance system is an elevator system 101. At block 606, a location 316 of the conveyance system is detected. The location 316 of the conveyance system may be detected by determined the location of the mobile computing device 200, as described above. At block 608, a time stamp 318 depicting when maintenance was performed on the part 102 of the conveyance system is detected. At block 610, a signature 319 of an individual 20 that performed maintenance on the part 102 of the conveyance system is obtained. The signature of an individual 20 may be a public identification key of a mobile computing device 200 belonging to the individual 20.

At block 612, the part identity 312 of the part 102, the location of the part 102, the time stamp 318, and the signature 319 is organized into a maintenance data package receipt 310. Images 314 and maintenance notes 313 may also be organized into the maintenance data package receipt 310. Thus, the method 600 may also include: receiving maintenance notes 313 from an individual 20 that performed maintenance on the part 102 of the conveyance system and/or capturing images of at least one of the conveyance system and the part 102. At block 614, the maintenance data package receipt 310 is uploaded into a blockchain network 400.

The method 600 may also comprise: authenticating the maintenance data package 310 receipt in the blockchain network 400; and verifying the maintenance data package receipt 310 in the blockchain network 400. During the authentication step of the method 600, the digital signature of the maintenance data package receipt 310 is checked to be from a valid sender. During the verification step of the method 600, the maintenance data package receipt 310 is checked to match certain properties such as proper size, valid references, etc. As mentioned above, the maintenance data package receipt 310 is verified by an owner of the conveyance system and/or a manufacturer of the conveyance system. The method 600 may further comprise: storing the maintenance data package receipt 310 into a blockchain network 400. The maintenance data package receipt 310 may then be retrieved from the blockchain network 400. The maintenance data package receipt 310 may be retrieved from the blockchain network 400 by scanning a QR code 500 identifying the conveyance system; and retrieving the maintenance data package 310 of the conveyance system from the blockchain network 400.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of utilizing blockchain to verify maintenance data of a system, the method comprising:
   determining a part identity of a part of the system;
   detecting a location of the system;
   detecting a time stamp depicting when maintenance was performed on the part of the system;
   organizing the part identity of the part, the location of the system, and the time stamp into a maintenance data package receipt;
   uploading the maintenance data package receipt into a blockchain network;

storing the maintenance data package receipt into the blockchain network;
scanning a part identification tag located proximate the system, the part identification tag identifying the system and linking to the blockchain network where the maintenance package is stored; and
retrieving the maintenance data package of the system from the blockchain network in response to scanning the part identification tag,
wherein the system is an elevator system or an escalator system.

2. The method of claim 1, further comprising:
authenticating the maintenance data package receipt in the blockchain network.

3. The method of claim 1, further comprising:
verifying the maintenance data package receipt in the blockchain network.

4. The method of claim 1, further comprising: retrieving the maintenance data package receipt from the blockchain network.

5. The method of claim 1, wherein the maintenance data package receipt further comprises an image of the part.

6. The method of claim 5, further comprising:
capturing an image of at least one of the system and the part; and
organizing the image into the maintenance data package receipt.

7. The method of claim 1, wherein the maintenance data package receipt further comprises maintenance notes for the part.

8. The method of claim 7, further comprising:
receiving the maintenance notes from an individual that performed maintenance on the part of the system; and
organizing the maintenance into the maintenance data package receipt.

9. The method of claim 1, further comprising:
obtaining a signature of an individual that performed maintenance on the part of the system, and
organizing the signature into the maintenance data package receipt.

10. The method of claim 9, wherein the signature of an individual is a public identification key of a mobile computing device belonging to the individual.

11. A computer program product tangibly embodied on a non-transitory computer readable medium, the computer program product including instructions that, when executed by a processor, cause the processor to perform operations comprising:
determining a part identity of a part of a system;
detecting a location of the system;
detecting a time stamp depicting when maintenance was performed on the part of the system;
organizing the part identity of the part, the location of the system, and the time stamp into a maintenance data package receipt; and
uploading the maintenance data package receipt into a blockchain network,
storing the maintenance data package receipt into the blockchain network;
scanning a part identification tag located proximate the system, the part identification tag identifying the system and linking to the blockchain network where the maintenance package is stored; and
retrieving the maintenance data package of the system from the blockchain network in response to scanning the part identification tag,
wherein the system is an elevator system or an escalator system.

12. The computer program product of claim 11, wherein the operations further comprise:
authenticating the maintenance data package receipt in the blockchain network.

13. The computer program product of claim 11, wherein the operations further comprise:
verifying the maintenance data package receipt in the blockchain network.

14. The computer program product of claim 11, wherein the operations further comprise:
storing the maintenance data package receipt into blockchain network.

15. The computer program product of claim 14, further comprising:
retrieving the maintenance data package receipt from the blockchain network.

* * * * *